United States Patent Office 2,847,436
Patented Aug. 12, 1958

2,847,436

2 - ARYL - 1,1,3,3 - TETRACYANOPROPENES AND THEIR SALTS, AND PREPARATION THEREOF

George N. Sausen, Wilmington, Del., assignor to E. I. du Pont de Nemours and Company, Wilmington, Del., a corporation of Delaware No Drawing. Application April 15, 1955
Serial No. 501,720

10 Claims. (Cl. 260—438)

This invention is concerned with new organic acids having the ionizable hydrogen attached to carbon, and with their salts and methods for their preparation; and is more particularly concerned with 2-aryl-1,1,3,3-tetracyanopropenes as acids and salts thereof, and with their preparation.

The common organic acids containing an aromatic nucleus are the carboxylic acid and phenolic acid types, or corresponding acids in which an oxygen atom has been replaced by a hetero atom such as sulfur. Aromatic acids in which the ionizable hydrogen is attached directly to carbon have not been studied and should be highly useful, particularly as an intermediate in the synthesis of other valuable compounds.

It is an object of this invention to provide a new class of monohydric organic acids containing an aromatic nucleus and having the ionizable hydrogen directly attached to carbon. Another object is to provide salts of this class of acids. A further object is to provide methods for readily preparing these acids and their salts. Other objects of the invention will become apparent from the specification and claims.

It has now been discovered that the reaction of tricyanovinyl aromatic compounds with sodiomalononitrile yields a new class of organic compounds, the 2-aryl-1,1,3,3-tetracyanopropenes and related structures. The 2 substituent may be any aromatic group attached directly to the tetra cyanopropene group by a carbon in a benzene ring (including an aromatic 6-carbon ring in a fused ring system) or in an aromatic heterocyclic ring (including such a ring in a fused ring system). Illustrated types of 2 substituents will include substituted and unsubstituted phenyl, naphthyl, quinolyl, julolidyl, furyl, pyrryl, and indolyl groups. The aryl substituent may be ring-substituted, e. g., with alkyl, alkoxy, halogen, nitro, hydroxy, hydroxy alkyl, amino or morpholino radicals, and the aminophenyls include those which are N-substituted, e. g., having N-alkyl, N-cyano alkyl, N-hydroxy alkyl, N-aryloxy alkyl, or N-phenyl substituents, as will be illustrated.

The new compounds of the present invention include not only the sodium salts of these aromatic substituted 1,1,3,3,-tetracyanopropenes, which are the primary products of the reaction above, but also the free acid forms of the 2-aryl-1,1,3,3-tetracyanopropenes which can be obtained from the sodium salts by passing them in solution through an acidic ion-exchange column, as well as the salts (both metal and amine salts, including quaternary ammonium salts) of the 2-aryl-1,1,3,3-tetracyanopropenes which are readily prepared from the corresponding sodium salt or the free acid by metathesis with a base.

For convenience in naming the compounds of this invention, the anion which is formed by removal of the single hydrogen of the propene stem of a 2-aryl-1,1,3,3-tetracyanopropene is designated as a 2-aryl-1,1,3,3-tetracyanopropenide ion and a corresponding generic designation for the compounds is used to include both acid and salt forms, viz., an ionizable compound characterized by having a 2-aryl-1,1,3,3-tetracyanopropenide anion, the anion being singly bonded to a cation (the hydrogen ion in the acid form and a metal or amine ion in the salt form).

In the preferred process of this invention, a benzene solution of a tricyanovinylaryl compound (tricyanovinylbenzene and the like) is slowly mixed with a solution of sodiomalononitrile in an inert liquid at 0–5° C. The reaction takes place smoothly at this temperature and no catalyst is required. The resulting sodium 2-aryl-1,1,3,3-tetracyanopropenide (i. e., sodium 2-phenyl-1,1,3,3-tetracyanopropenide) may be recovered by evaporation of the solvent, or it may be converted to the free acid by treating an aqueous solution with an acidic ion-exchange resin, or it may be converted to another salt by metathesis with a base.

In the following examples, which illustrate preferred embodiments of the invention, parts are by weight.

EXAMPLE I

Tricyanovinylbenzene is prepared in benzene solution by the reaction of malononitrile with an excess of benzoyl cyanide in the presence of catalytic quantities of piperidine acetate and free acetic acid. The reaction is carried out at reflux temperature and water is removed as it separates from the reflux condensate. When no more water is formed, benzene and excess benzoyl cyanide are removed by distillation. The residue of tricyanovinylbenzene is purified by washing with water and recrystallizing from cyclohexane.

A suspension of sodiomalononitrile in ethanol, working in a nitrogen atmosphere, is prepared by the addition of 195 parts of malononitrile in 198 parts of ethanol to a solution of sodium ethoxide from 68 parts of sodium in 946 parts of ethanol. An additional 711 parts of ethanol is added. The suspension of sodiomalononitrile is cooled to 0–5° C. and a solution of 529 parts of tricyanovinylbenzene in a mixture of 2368 parts of ethanol and 1495 parts of benzene is added slowly with stirring over a one-half hour period. The resulting solution becomes homogeneous and is stirred an additional hour at 5°. Most of the solvent is removed at reduced pressure. Benzene is added to the residual purple oil and the solution is stored overnight at 5° C. The precipitate which forms is filtered, washed well with benzene and dried to give 463 parts (65.4%) of sodium 2-phenyl-1,1,3,3,-tetracyanopropenide in the form of dull white crystals melting above 300° C. Recrystallization several times from acetone-ether gives the product in the form of white needles, M. P. >300° (slight "yellowing" occurs above 250°).

*Analysis.*—Calcd. for $C_{13}H_{15}N_4Na$: C, 65.00; H, 2.10; N, 23.33; Na, 9.56. Found: C, 65.41; H, 2.33; N, 24.26, 24.31; Na, 9.5.

EXAMPLE II

A solution of sodiomalononitrile in tetrahydrofuran is prepared by adding 95 parts of malononitrile in 87 parts of methanol to a solution of sodium methoxide prepared from 33 parts of sodium and 317 parts of methanol. The sodiomalononitrile is precipitated by adding an excess of ether and cooling the mixture. The salt is filtered, washed with ether to remove alcohol, and then suspended in 1770 parts of tetrahydrofuran. A solution of 257 parts of tricyanovinylbenzene in 768 parts of benzene is added to the suspension of sodiomalononitrile at 5° C. during a period of 12 minutes. The resulting mixture is stirred for one hour at 5° C. and stored overnight at this temperature. The solvent is removed by distillation at reduced pressure, leaving a brown residue. This residue is washed with benzene and dried to yield 259 parts (75.2%) of sodium 2-phenyl-1,1,3,3-tetracyanopropenide.

EXAMPLE III

To a solution of 24 parts of sodium 2-phenyl-1,1,3,3-tetracyanopropenide in 200 parts of water is added a solution of 11 parts of tetramethylammonium chloride in 100 parts of water. After the addition the suspension is heated over steam and water is added until a clear solution is obtained. Upon cooling the solution needles of tetramethylammonium 2-phenyl-1,1,3,3-tetracyanopropenide precipitate. Recrystallization of the product from water (using "Darco" filter aid for decolorization) gives 20 parts of colorless needles with a double melting point, 113.5–115° and 141.5–142.5°. This product apparently contains water of crystallization, for after prolonged drying at 125–130° under 0.1 mm. pressure, the anhydrous salt is obtained in the form of colorless needles, M. P. 141–142.5°. The light absorption spectrum of an ethanol solution of this compound shows a maximum of absorption at 357 millimicrons (molecular extinction coefficient 23,200) with a secondary absorption peak at 254 millimicrons (molecular extinction coefficient 10,800).

*Analysis.*—Calcd. for $C_{17}H_{17}N_5$: C, 70.08; H, 5.88; N, 24.04. Found: C, 69.84; H, 5.92; N, 24.06, 24.41.

EXAMPLE IV

A column of a cation-exchange resin ("Amberlite IR–120H") is prepared in acid form by treating with aqueous acid, followed by washing with water until the effluent is acid free. The column is then flushed with acetone to remove part of the water. An acetone solution of 406 parts of tetramethylammonium 2-phenyl-1,1,3,3-tetracyanopropenide is passed through the column and the column is eluted with additional acetone. The combined acetone solutions are evaporated under nitrogen and dried briefly under high vacuum. The residue is triturated with benzene, separated by filtration, and dried to yield 332 parts (93.7%) of 2-phenyl-1,1,3,3-tetracyanopropene dihydrate in the form of yellow needles melting with decomposition at 88° C. The light absorption spectrum of an ethanol solution of this compound shows a maximum of absorption at 357 millimicrons (molecular extinction coefficient 22,800) with a secondary peak at 254 millimicrons (molecular extinction coefficient 10,550). The pKa of an aqueous solution of this compound is 2.3 (logarithm of the reciprocal of the dissociation constant).

*Analysis.*—Calcd. for $C_{13}H_6N_4 \cdot 2H_2O$: C, 61.41; H, 3.96; N, 22.04. Found: C, 62.42; H, 4.22; N, 22.01.

EXAMPLE V

To a solution of 480 parts of sodium 2-phenyl-1,1,3,3-tetracyanopropenide in 3000 parts of water is added an aqueous solution of 436 parts of barium chloride in 1000 parts of water. The solution is allowed to stand overnight at 5° C. The brown precipitate which forms is filtered, washed with a small portion of cold water and dried to yield 365 parts (63.9%) of barium 2-phenyl-1,1,3,3-tetracyanopropenide melting above 300° C.

EXAMPLE VI

An aqueous solution containing 20% by weight, of sodium 2-phenyl-1,1,3,3-tetracyanopropenide is prepared. One volume portions of this solution are mixed with 10 volumes of a 10% (by weight) solution of each of the salts shown below. In each instance the corresponding 2-phenyl-1,1,3,3-tetracyanopropenide separates from the mixture. The color and form of the products are as indicated in Table I.

*Table 1*

PREPARATION OF SALTS OF 2-PHENYL-1,1,3,3-TETRACYANOPROPENE

| Aqueous Salt Solution | 2-Phenyl-1,1,3,3-tetracyanopropenide Formed | Color and form of 2-Phenyl-1,1,3,3-tetracyanopropenide |
|---|---|---|
| cadmium bromide | cadmium++ | white crystals. |
| cobaltous acetate | cobaltous | orange crystals. |
| cupric sulfate | cupric | black crystals. |
| ferrous sulfate | ferrous | yellow crystals. |
| manganous chloride | manganous | white crystals. |
| N-methylquinolinium iodide | N-methylquinolinium | yellow needles. |
| nickelous sulfate | nickelous | greenish powder. |
| silver nitrate | silver+ | white powder. |
| tetraethylammonium chloride | tetraethylammonium | white needles. |
| tetramethylammonium chloride | tetramethylammonium | Do. |
| zinc acetate | zinc++ | white crystals. |

The cupric salt of 2-phenyl-1,1,3,3-tetracyanopropene is useful as a pigment for paints, printing inks and the like, for which purpose pigment dispersions may be prepared by the usual methods in any conventional coating composition vehicle. Suitable vehicles include linseed oil, alkyd resin solutions and solutions of nitrocellulose. An excellent black enamel is formed by dispersing cupric 2-phenyl-1,1,3,3-tetracyanopropenide in an alkyd resin solution. A film of this enamel on wood or metal dries to a rich glossy black coating with high hiding power.

Other salts of 2-phenyl-1,1,3,3-tetracyanopropene exhibit useful responses to various types of radiation. For example, silver 2-phenyl-1,1,3,3-tetracyanopropenide emits a visible blue-green luminescence when exposed to cathode rays in an evacuated space.

The salts of 2-phenyl-1,1,3,3-tetracyanopropene have surprising advantages over the salts of the seemingly analogous 2-methyl-1,1,3,3-tetracyanopropene. Thus, cupric 2-methyl-1,1,3,3-tetracyanopropenide is a dull tan in color with negligible hiding power when dispersed to form an enamel as described above. It is useless as a pigment. Silver 2-methyl-1,1,3,3-tetracyanopropenide exhibits no luminescence when exposed to cathode rays in an evacuated space. The same is true of silver 1,1,3,3-tetracyanopropenide.

Sodium 2-methyl-1,1,3,3-tetracyanopropenide is much less soluble in water than sodium 2-phenyl-1,1,3,3-tetracyanopropenide. This unexpected difference in solubility makes it difficult to prepare other salts. The method describe above was attempted. A saturated solution at room temperature contained only a 7% concentration of sodium 2-methyl-1,1,3,3-tetracyanopropenide. One-volume portions of this 7% solution of sodium 2-methyl-1,1,3,3-tetracyanopropenide are mixed with 10-volume portions of 10% salt solutions as above. In the instances in which the corresponding 2-methyl-1,1,3,3-tetracyanopropenide separates from the mixture, its color and form are as indicated in Table II.

Table II
PREPARATION OF SALTS OF 2-METHYL-1,1,3,3-TETRACYANOPROPENE

| Aqueous Salt Solution | 2-Methyl-1,1,3,3-tetracyanopropenide Formed | Color and form of 2-Methyl-1,1,3,3-tetracyanopropenide |
|---|---|---|
| cadmium bromide | (none separated) | |
| cobaltous acetate | ___do___ | |
| cupric sulfate | ___do___ | |
| ferrous sulfate | ___do___ | |
| manganous chloride | ___do___ | |
| N-methylquinolinium iodide. | N-methylquinolinium___ | yellow powder. |
| nickelous sulfate | (none separated) | |
| silver nitrate | silver+ | white powder. |
| tetraethylammonium chloride. | tetraethylammonium___ | white needles. |
| tetramethylammonium chloride | tetramethylammonium_ | Do. |
| zinc acetate | (none separated) | |

EXAMPLE VII p-Dimethylaminobenzoyl cyanide is prepared from p-dimethylaminobenzoic acid by conversion to the acid halide, followed by treatment with cuprous cyanide or with pyridine and hydrogen cyanide. These conversions are shown by Wagner and Zook, "Synthetic Organic Chemistry," John Wiley and Sons, Inc., New York, 1953, method 335 (page 546) and method 381 (page 595). p-Dimethylaminobenzoyl cyanide is substituted for benzoyl cyanide in the procedure of the first paragraph of Example I and p-tricyanovinyl-N,N-dimethylaniline is obtained.

A suspension of sodiomalononitrile in ethanol (nitrogen atmosphere) is prepared by the addition of 232 parts of malononitrile in 237 parts of ethanol to a solution of sodium ethoxide from 81 parts of sodium in 1580 parts of ethanol. An additional 395 parts of ethanol is added, the suspension is cooled to 2° C. and a solution of 782 parts of p-tricyanovinyl-N,N-dimethylaniline in 9770 parts of tetrahydrofuran is added slowly with stirring over a period of twenty-five minutes. The solution is stirred an additional hour at 5° C. and then two hours at room temperature. The solvent is removed by distillation at reduced pressure. Crude sodium 2-(p-N,N-dimethylaminophenyl) - 1,1,3,3 - tetracyanopropenide (1159 parts) is obtained as a brown residue, M. P.> 300° C.

EXAMPLE VIII

A filtered solution of 283 parts of crude sodium 2-(p-N,N-dimethylaminophenyl) - 1,1,3,3 - tetracyanopropenide in 5000 parts of water is treated with a solution of 111 parts of tetramethylammonium chloride in 500 parts of water. The resulting solution is cooled, and the violet-colored precipitate which forms is separated by filtration, washed with cold water and dried to give 193 parts (57.8% from the tricyanovinyl compound) of tetramethylammonium 2 - (p - N,N - dimethylaminophenyl)-1,1,3,3-tetracyanopropenide. Recrystallization from ethanol gives the product in the form of violet plates, M. P. 233–238° C. (dec.). The light absorption spectrum of an acetone solution of this compound shows a maximum of absorption at 360 millimicrons (molecular extinction coefficient 32,300) and a small secondary absorption in the range of 500–520 millimicrons.

*Analysis.*—Calcd. for $C_{19}H_{22}N_6$: C, 68.23; H, 6.63; N, 25.13. Found: C, 67.93; H, 6.69; N, 24.91, 25.00.

EXAMPLE IX

Tricyanovinyl aromatic compounds, prepared by various methods, are substituted for tricyanovinyl benzene in the procedure of Example I to produce the products shown in Table III. The sodium 2-aryl-1,1,3,3-tetracyanopropenides produced as primary products are converted to the corresponding free acids by the process of Example IV and to other salts by metathesis as in Example VI.

Table III
PREPARATION OF SODIUM 2-ARYL-1,1,3,3-TETRACYANOPROPENIDES FROM VARIOUS TRICYANOVINYL AROMATIC COMPOUNDS BY REACTION WITH SODIOMALONONITRILE

| No. | Tricyanovinyl Compound | Product (Sodium Salt) |
|---|---|---|
| 1 | 4-(tricyanovinyl)anisole | 2-(p-methoxyphenyl)-1,1,3,3-tetracyanopropenide. |
| 2 | 2-(tricyanovinyl)furan | 2-(2-furyl)-1,1,3,3-tetracyanopropenide. |
| 3 | α-(tricyanovinyl)naphthalene | 2-(α-naphthyl)-1,1,3,3-tetracyanopropenide. |
| 4 | p-chlorotricyanovinylbenzene | 2-(p-chlorophenyl)-1,1,3,3-tetracyanopropenide. |
| 5 | m-nitrotricyanovinylbenzene | 2-(m-nitrophenyl)-1,1,3,3-tetracyanopropenide. |
| 6 | 4-tricyanovinylaniline | 2-(p-aminophenyl)-1,1,3,3-tetracyanopropenide. |
| 7 | 4-tricyanovinyl-N,N-dimethylaniline. | 2-(p-N,N-dimethylaminophenyl)-1,1,3,3-tetracyanopropenide. |
| 8 | 2,6-dimethyl-4-tricyanovinylaniline. | 2-(4-amino-3,5-dimethylphenyl)-1,1,3,3-tetracyanopropenide. |
| 9 | 1-methyl-2-tricyanovinylpyrrole. | 2-(1-methyl-2-pyrryl)-1,1,3,3-tetracyanopropenide. |
| 10 | N-butyl-N-(β-cyanoethyl)-p-tricyanovinylaniline. | 2-(p-[N-butyl-N-(β-cyanoethyl)amino]phenyl)-1,1,3,3-tetracyanopropenide. |
| 11 | 6-tricyanovinyl-1,2,3,4-tetrahydroquinoline. | 2-(1,2,3,4-tetrahydro-6-quinolyl)-1,1,3,3-tetracyanopropenide. |
| 12 | N-phenyl-p-tricyanovinylaniline. | 2-(p-[N-phenylamino]phenyl)-1,1,3,3-tetracyanopropenide. |
| 13 | N-(p-tricyanovinylphenyl)-ethanolamine. | 2-(p-[β-hydroxyethylamino]phenyl)-1,1,3,3-tetracyanopropenide. |
| 14 | N-(p-tricyanovinylphenyl)-morpholine. | 2-(p-morpholinophenyl)-1,1,3,3-tetracyanopropenide. |
| 15 | 9-(tricyanovinyl)julolidine | 2-(9-julolidyl)-1,1,3,3-tetracyanopropenide. |
| 16 | 3-(tricyanovinyl)indole | 2-(3-indolyl)-1,1,3,3-tetracyanopropenide. |
| 17 | N-β-(1-naphthoxy)ethyl-N-methyl-4-tricyanovinylaniline. | 2-(p-[N-β-(1-naphthoxy)ethyl-N-methylamino]phenyl)-1,1,3,3-tetracyanopropenide. |
| 18 | 2,6-dimethyl-4-tricyanovinylphenol. | 2-(3,5-dimethyl-4-hydroxyphenyl)-1,1,3,3-tetracyanopropenide. |
| 19 | 2,4-dimethyl-6-tricyanovinylphenol. | 2-(3,5-dimethyl-2-hydroxyphenyl)-1,1,3,3-tetracyanopropenide. |

Tricyanovinyl compounds Nos. 1, 2, 3 and 4 in the above table are prepared by methods similar to that of the first paragraph of Example I, and as specifically disclosed in my application Serial No. 501,719, filed on even date herewith. Tricyanovinyl compounds Nos. 5, 6 and 7 are prepared by oxidizing the corresponding α,β,β-tricyanoethyl aromatic compounds. Thus 4-(α,β,β-tricyanoethyl)-N,N-dimethylaniline, prepared by acidifying with acetic acid the reaction product of p-dimethylaminobenzalmalononitrile and potassium cyanide in aqueous ethanol solution, is oxidized by the action of lead tetraacetate in glacial acetic acid to yield 4-tricyanovinyl-N,N-dimethylaniline.

Another source of tricyanovinyl aromatic compounds, by which compounds Nos. 8 to 17 in Table III are prepared, is from the reaction of tetracyanoethylene with:

(1) Primary aromatic amines in which neither of the annular carbons immediately adjacent to the carbon bonded to the amino substituent is directly bonded to hydrogen or halogen and in which hydrogen is bonded to the annular carbon in the 4-position, considering the carbon bonded to the amino substituent as being in the 1-position;

(2) Secondary and tertiary aromatic amines in which hydrogen is bonded to the annular carbon in the 4-position;

(3) Aromatic heterocyclic amines in which the ring is resonance stabilized, the ring contains at least one carbon directly bonded to hydrogen, and only two bonds of the nitrogen are attached to the ring.

Resonance in organic molecules and its effect on their stability is discussed in detail by G. W. Wheland in his book, "The Theory of Resonance," John Wiley and Sons, New York, 1944.

The reaction of tetracyanoethylene with the amines noted above to form C-tricyanovinylamines takes place by a unique condensation in which the elements of hydrogen cyanide are lost. In the C-tricyanovinylamines formed by the reaction of tetracyanoethylene with the aromatic amines noted above, the tricyanovinyl substituent becomes attached to the aromatic ring at the 4-position. In the C-tricyanovinylamines formed by the reaction of tetracyanoethylene with the heterocyclic amines noted above, when the heterocyclic amine contains more than one annular carbon directly bonded to hydrogen, the tricyanovinyl group replaces preferentially that hydrogen which is the more readily replaced in other alkylation reactions.

Tetracyanoethylene is prepared by the reaction of sulfur monochloride with malononitrile, conveniently in the presence of a liquid diluent and thereafter separating the tetracyanoethylene formed from the reaction mixture.

The tricyanovinylphenols, Nos. 18 and 19 in Table III, are prepared by the reaction of tetracyanoethylene with phenols containing at least one hydrogen atom attached at a position other than meta in the phenol ring.

Tricyanovinyl aromatic compounds prepared by any of the methods noted above react with sodiomalononitrile according to the present invention to yield sodium 2-aryl-1,1,3,3-tetracyanopropenides. The sodium 2-aryl-1,1,3,3-tetracyanopropenides are converted to the corresponding free acids in aqueous solution by passing them through an ion-exchange column in acid form in the manner of Example IV. The free acid is then converted to the barium salt by reaction with barium hydroxide or barium carbonate. The barium salts of these 2-aryl-1,1,3,3-tetracyanopropenes are water soluble and are very useful for preparing other salts of these acids by reacting with aqueous solutions of the corresponding sulfate. Barium sulfate precipitates quantitatively as a by-product and is readily filtered off leaving an aqueous solution of a 2-aryl-1,1,3,3-tetracyanopropene salt of the cation which was introduced in the form of its sulfate. In this way barium 2-aryl-1,1,3,3-tetracyanopropenides react with aqueous solutions of the sulfates of Al, Ce, Cs, $Cr^{++}$, $Cr^{+++}$, $Co^{++}$, $Co^{+++}$, $Cu^{++}$, $Fe^{++}$, $Fe^{+++}$, Ga, In, $Ni^{++}$, Li, K, $Mn^{++}$, Rb, $Sn^{++}$, $Sn^{++++}$, Th, $UO_2$, VO, Zn and Zr to yield the corresponding metal salts of the 2-aryl-1,1,3,3-tetracyanopropene.

The process of the present invention is generic to the reaction of a tricyanovinyl aromatic compound with sodiomalononitrile. The reaction is exothermic and it is convenient though not essential to provide for uniform dissipation of the heat of reaction by carrying out the process in the presence of a liquid medium which is inert to the reactants. Suitable media are the alcohols such as methanol, ethanol, n-propyl alcohol, isopropyl alcohol, the butanols, ethylene glycol, glycerine and the like, ethers such as dimethyl ether, diethyl ether, diisopropyl ether and the like, cyclic ethers such as tetrahydrofuran and dioxane, ketones such as acetone, and liquid hydrocarbons such as pentane, hexane, cyclohexane, cyclohexene, benzene, toluene, the xylenes and the like.

The temperature at which the reaction of this invention takes place may be varied within wide limits. For example, by using a high boiling solvent or by operating in a closed system under pressure, temperatures in the range of 100–200° C. may be employed. Similarly, by using a medium with a low freezing point, temperatures below 0° C. may be used. However, for practical purposes it is best to operate below the normal boiling point of the reaction medium at temperatures between 0 and 100° C., particularly at temperatures in this range below 50° C.

The anions of the 2-aryl-1,1,3,3-tetracyanopropenes of the present invention precipitate gelatin from aqueous solution and are useful as hardeners for photographic gelatin emulsions. Thus, an aqueous solution of sodium 2-phenyl-1,1,3,3-tetracyanopropenide acidified to pH 4.5 produces a quantitative precipitation of gelatin when added to an aqueous gelatin solution. By the same token the products of this invention are active tanning agents for leather, aqueous solutions of the free acids, i. e., 2-phenyl-1,1,3,3-tetracyanopropene and the like, being particularly suitable as media in which to soak hides to convert them to leather.

The cupric 2-aryl-1,1,3,3-tetracyanopropenide salts are useful as pigments for paints, printing inks and the like, which may be prepared by dispersing the copper salt in a conventional vehicle in the same manner as other pigments.

The 2-aryl-1,1,3,3-tetracyanopropenide salts of this invention include many compounds possessing particular utility because of their response to various types of radiation.

Since many different embodiments of the invention may be made without departing from the spirit and scope thereof, it is to be understood that the invention is not limited by the specific illustrations except to the extent defined in the following claims.

What is claimed is:

1. The 2-aryl-1,1,3,3-tetracyanopropenide salt selected from the group consisting of metal salts and quaternary ammonium salts, wherein said 2-aryl substituent consists of a carbocyclic hydrocarbon group, having 1 to 2 rings, and up to one substituent on a ring of said hydrocarbon group selected from the class consisting of amino, hydroxy, lower alkoxy, chloro and nitro substituents.

2. The process for preparing a 2-aryl-1,1,3,3-tetracyanopropenide which comprises reacting a tricyanovinyl aromatic compound with sodiomalononitrile.

3. The process which comprises mixing a tricyanovinyl aryl compound with sodiomalononitrile in an inert liquid and recovering the resulting sodium 2-aryl-1,1,3,3-tetracyanopropenide as a salt.

4. The process which comprises treating an aqueous solution of a sodium 2-aryl-1,1,3,3-tetracyanopropenide, formed by reacting a tricyanovinylaryl compound with sodiomalononitrile, with an acidic ion-exchange resin to convert the 2-aryl-1,1,3,3-tetracyanopropenide to the free acid form.

5. The process which comprises mixing a tricyanovinyl aryl compound in which the aryl group is attached by a carbon in a benzene ring with sodiomalononitrile in an inert liquid and recovering the resulting sodium 2-aryl-1,1,3,3-tetracyanopropenide.

6. Sodium 2-phenyl-1,1,3,3-tetracyanopropenide.

7. Tetramethylammonium 2-phenyl-1,1,3,3-tetracyanopropenide.

8. Barium 2-phenyl-1,1,3,3-tetracyanopropenide.

9. Cupric 2-phenyl-1,1,3,3-tetracyanopropenide.

10. Sodium 2-(p-N,N-dimethylaminophenyl)-1,1,3,3-tetracyanopropenide.

No references cited.